United States Patent [19]

Schellstede

[11] 4,313,785
[45] Feb. 2, 1982

[54] METHOD AND APPARATUS FOR TREATING WASTE ROCK CUTTINGS

[76] Inventor: Herman J. Schellstede, P.O. Box 208, New Iberia, La. 70560

[21] Appl. No.: 87,947

[22] Filed: Oct. 25, 1979

[51] Int. Cl.³ .............................................. B01D 1/22
[52] U.S. Cl. ................................ 159/6 W; 159/13 A; 159/49
[58] Field of Search ........... 159/2 E, 6 W, 6 R, 13 A, 159/DIG. 1, 4 A, 47, 49

[56] References Cited

U.S. PATENT DOCUMENTS

| | | |
|---|---|---|
| Re. 26,352 | 2/1968 | Greenfield ........................ 159/13 A |
| 2,110,309 | 3/1938 | Raisch . |
| 2,266,586 | 12/1941 | Branum . |
| 2,360,257 | 10/1944 | Muller et al. . |
| 2,743,014 | 4/1956 | Frazier . |
| 2,936,889 | 5/1960 | Henke et al. . |
| 2,973,312 | 2/1961 | Logan . |
| 3,211,209 | 10/1965 | Latinen et al. ..................... 159/6 W |
| 3,242,969 | 3/1966 | Kiguchi ............................. 159/6 W |
| 3,513,788 | 5/1970 | Ostrin . |
| 3,560,369 | 2/1971 | Rowland et al. . |
| 3,570,420 | 3/1971 | Lewis . |
| 3,616,266 | 10/1971 | Boulder et al. . |
| 3,626,875 | 12/1971 | Keller et al. . |
| 3,652,447 | 3/1972 | Yant . |
| 3,658,015 | 4/1972 | Griffin et al. . |
| 3,658,654 | 4/1972 | Gutberlet et al. . |
| 3,734,774 | 5/1973 | Culpepper . |
| 3,766,997 | 10/1973 | Heilhecker et al. . |
| 3,780,676 | 12/1973 | Hazzard et al. . |
| 3,812,897 | 5/1974 | Latinen .............................. 159/2 E |
| 3,860,019 | 1/1975 | Teague . |
| 3,997,388 | 12/1976 | Simon . |
| 3,997,406 | 12/1976 | Arvanitakis . |
| 4,039,794 | 8/1977 | Kasper . |
| 4,040,866 | 8/1977 | Mondshine . |
| 4,048,927 | 9/1977 | Mallek et al. . |
| 4,077,868 | 3/1978 | Chambers . |
| 4,084,521 | 4/1978 | Herbold et al. . |
| 4,094,769 | 6/1978 | Brown . |

Primary Examiner—Norman Yudkoff
Attorney, Agent, or Firm—Harvey B. Jacobson

[57] ABSTRACT

Apparatus is disclosed for treating a slurry of cuttings in an oil base oil well drilling fluid, such as is typically used in drilling production wells. The cuttings having a coating of hydrocarbon substances after treatment in the apparatus are sufficiently free of hydrocarbons to be dischargeable into a body of water without creating an environmental problem or a discernible film on the surface of the water. A two-stage continuous process is used for raising the temperature of a relatively thin layer of pulverized rock fragments or other cuttings to effect serial evolution of hydrocarbons in gaseous form. In the first stage, the incoming rock fragments are forced into a thin annular region bounded by a surrounding wall of corrosion-resistant metal raised to a temperature at which the bulk of hydrocarbon products are gasified for removal. In the second stage, the pulverized product of the first stage is forced into a cylindrical annular region from which the remainder of the hydrocarbon products are withdrawn. A portion of the gaseous products formed can be mixed with air or oxygen for combustion to assist in meeting the energy needs of the apparatus.

14 Claims, 6 Drawing Figures

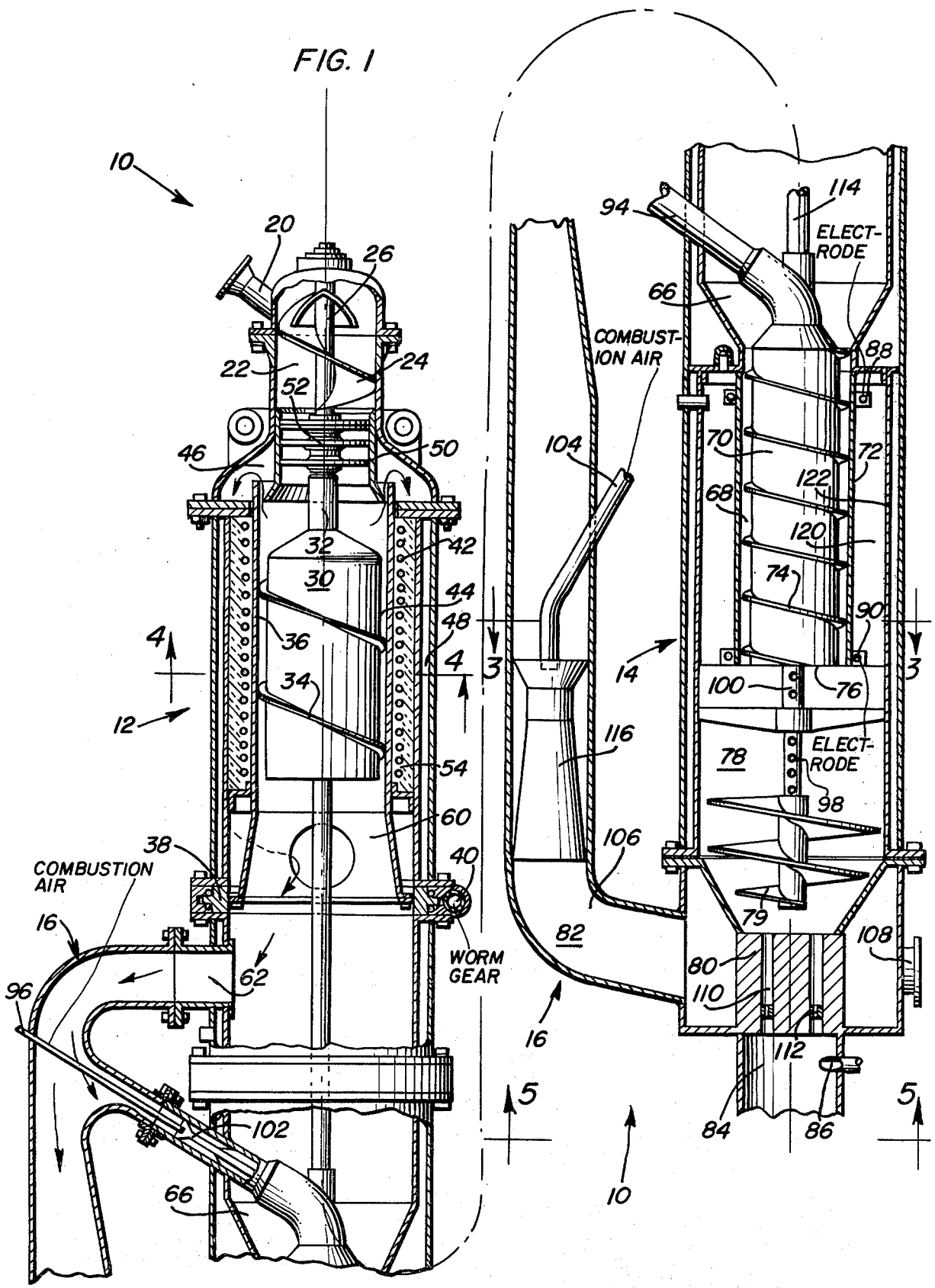

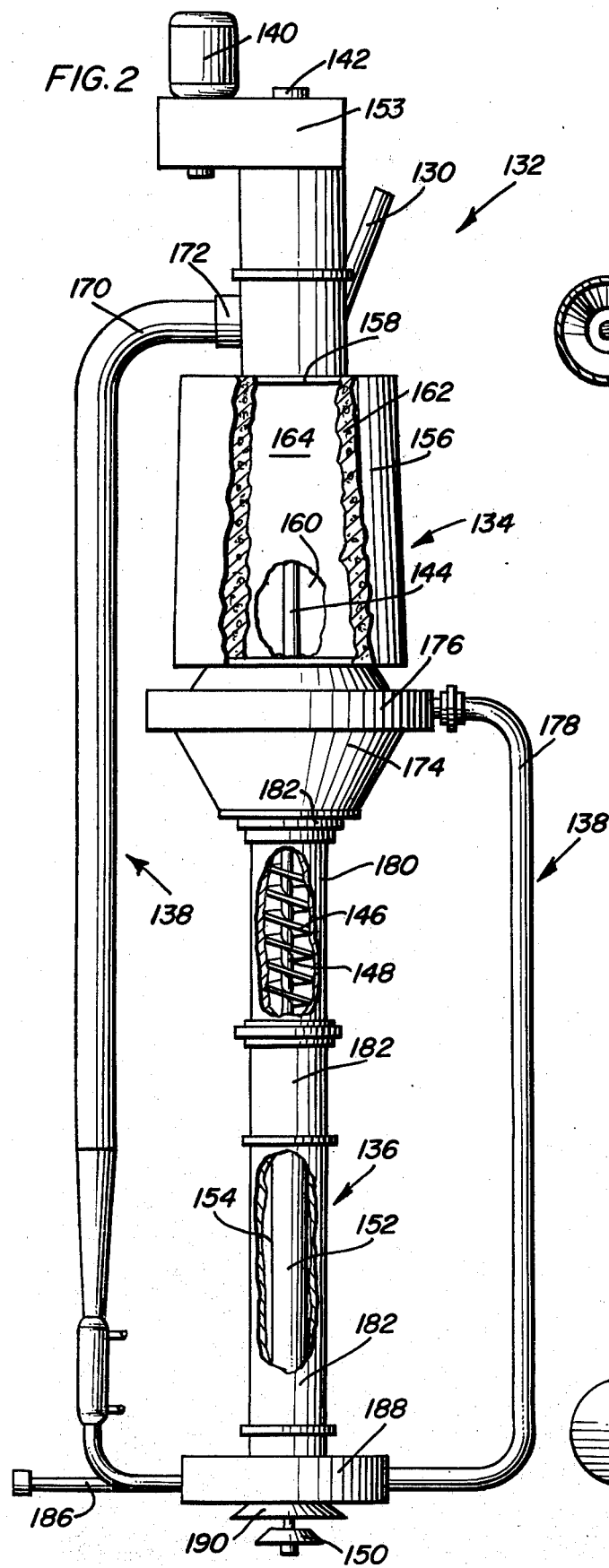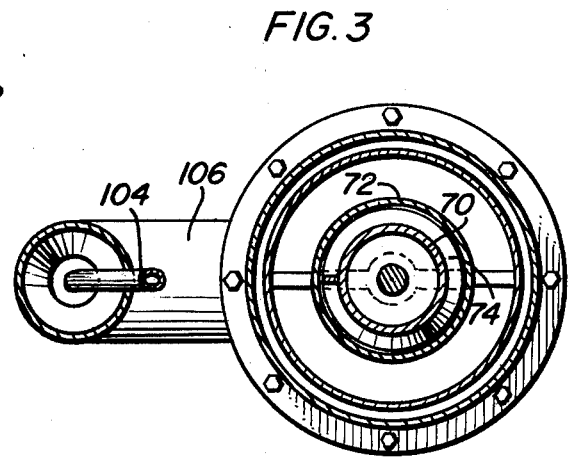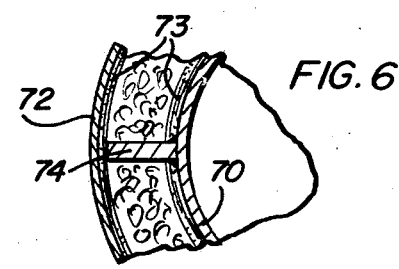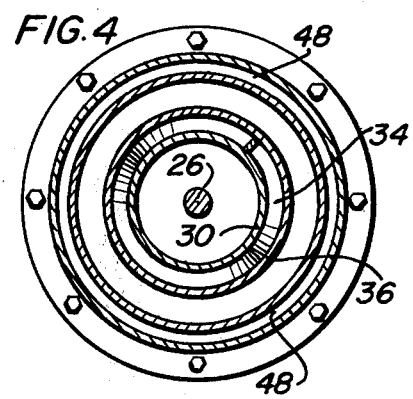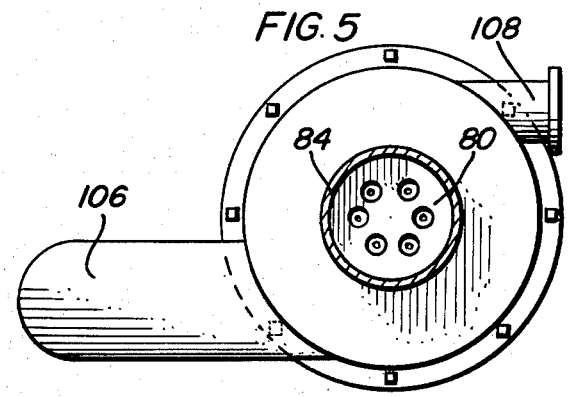

METHOD AND APPARATUS FOR TREATING WASTE ROCK CUTTINGS

BACKGROUND OF THE INVENTION

1. Field of the Invention

The invention relates to oil field technology, particularly in the drilling of production oil well apparatus. Although not limited to any particular location of use, the invention has particular utility at locations of drilling along the continental shelf, where environmental problems are particularly acute when oil base drilling muds are employed.

2. Disclosure Statement

U.S. Pat. No. 3,693,951, issued Sept. 26, 1972, to Lawhon et al, discloses a method and apparatus for treatment of well cuttings where a conveyor belt moves the cuttings through a preheater for partial drying, followed by treating in a high-intensity infrared heating chamber in which all volatile material is expelled from the cuttings. However, the Lawhon device requires a source of electricity and does not lend itself to high temperature use at which entrapped hydrocarbons in rock fragments, such as are particularly found between layers of cuttings derived from shale formations, can be successfully removed. U.S. Pat. No. 4,139,462, issued Feb. 13, 1979, to Sample, Jr., discloses a method for removing volatile materials from drilled cuttings by vaporizing the materials in an oxygen-free atmosphere at a relatively low temperature. Other patents relating to the field include the following:

U.S. Pat. No. 3,707,129—Dec. 26, 1972—Kawashimo et al.
U.S. Pat. No. 3,693,733—Sept. 26, 1972—Teague
U.S. Pat. No. 2,171,535—Sept. 5, 1939—Berg et al.
U.S. Pat. No. 3,766,866—Oct. 23, 1973—Krumm
U.S. Pat. No. 4,116,136—Sept. 26, 1978—Mallek et al.

Nickel-chromium alloys have been disclosed as high-temperature corrosion-resistant materials, such as in U.S. Pat. No. 4,137,074, issued Jan. 30, 1979, to Firnhaber, U.S. Pat. No. 3,859,060, issued Jan. 7, 1975, to Eiselstein et al, and in U.S. Pat. No. 3,816,110, issued June 11, 1974, to Shimotori et al. However, no teaching of corrosion and erosion resistance under the combination of high temperature, abrasiveness of rock fragments, and corrosive vapors present in a heating apparatus of the present invention exists.

SUMMARY OF THE INVENTION

The invention provides an apparatus and method for removing hydrocarbons adhering to fragments of rock produced in drilling of wells, particularly where an oil base drilling fluid is used.

Accordingly, a primary object of the invention is to remove the film or layer of oily components of oil base drilling fluid from cuttings formed in oil and gas well drilling operations.

Another object is to provide a method and apparatus for effectively using gaseous products formed by volatilizing hydrocarbons adhering to drill cuttings.

Still another object is to provide a cuttings burner apparatus having a heating zone for final removal of hydrocarbons characterized by a high degree of resistance to corrosion, erosion, and chemical attack from volatile products formed therein.

Yet another object is to form a continuous two-stage apparatus and process for burning hydrocarbons and other volatile materials from cuttings, where each stage is carried out in an apparatus having a common shaft for transfer of materials into the first stage, from the first to the second stage, and from the second stage in oil-free form from the apparatus.

Yet another object is to provide apparatus which generates a portion of the heat required for operation of the burner from waste gaseous products resulting from the heating of the cuttings.

A further object is to provide recovery of waste heat by injection of oxygen into the stream of evolved hydrocarbon vapors.

Still a further object is to provide a method for accomplshing the preceding objects.

Another further object is to provide a processed pulverized solid product which contains less than one part per million of hydrocarbons.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectional view of a preferred form of the invention in which two stages of treatment are provided with the stages being connected by a common shaft for operation of each stage and for transfer of materials to and from each stage.

FIG. 2 is a side elevational view of a second form of the invention, partly broken away to show internal components, where the first stage has a conical surface on the interior of which incoming contaiminated cuttings are applied and from which heated cuttings are removed by flasking, scraping or the like; the first stage and second stage of the second form of the invention are connected by a common shaft for transfer of materials through the second stage and between stages.

FIG. 3 is a transverse sectional view of the apparatus of FIG. 1, taken substantially upon a plane passing along section line 3—3 on FIG. 1.

FIG. 4 is a transverse sectional view of the apparatus of FIG. 1, taken substantially upon a plane passing along section line 4—4 of FIG. 1.

FIG. 5 is a transverse sectional view of the apparatus of FIG. 1, taken substantially upon a plane passing along section line 5—5 of FIG. 1.

FIG. 6 is an enlarged fragmentary sectional view, similar to a portion of FIG. 3, showing the laminar flow with a liquified inner and outer layers.

DESCRIPTION OF THE PREFERRED EMBODIMENTS

As an oil well is drilled from an off shore or inland barge or rig through various geological formations, chemicals are added to the drilling fluid to provide thermal stability, lubrication, and to consolidate the geological components in the wall of the hole being drilled in order to reduce the incidence of the collapsing of the walls around the drill pipe and to further avoid needlessly enlarging the hole or jamming of the drill pipe. Drilling fluid is continuously pumped into the drill hole and the cuttings or material cut from the formation are suspended in the fluid and raised to the surface for separation and recycling of the drilling fluid back into the drill hole. While water base drilling fluids are suitable for drilling in certain geological formations, in certain other formations it is necessary or desirable to use an oil base drilling fluid. If a water base drilling fluid is used, disposal is a relatively simple problem. However, disposal of cuttings from an oil base drilling fluid preculdes permanently discarding by dumping into the sea offshore or placing in a pit on land due to contamination of the cuttings by hydrocarbon from the oil components of the drilling fluid. Inasmuch as strict regulations now cover the disposal of biological pollutants both on land and offshore, it is essential to remove the oil which permeates cuttings when oil base drilling fluids are used, and even to remove the small residues present in water base cuttings naturally. In those instances where a drilling operation must necessarily employ an oil base drilling fluid, and where it is economically not feasible or technically impossible to complete a well with water base fluids, it becomes essential to economically dispose of oily cuttings without endangering the environment.

The two present methods for treating cuttings contaminated by oil including washing the oil from the currings and burning the oil off are not very effective. In addition, washing creates the further problem of disposal of the oily chemical waste generated, and burning creates the problem of incomplete combustion and a resulting dense smoke, causing an air pollution problem which can be as severe as the water pollution problem sought to be avoided. Regulations in the United States, in countries of Europe, and elsewhere either prohibit or severely restrict the dumping or other disposal of pollutants. Various bodies and agencies have adapted regulations and standards, typical criteria of which define a violation of oil pollution regulations if the presence of any residual sheen upon water is visible after discharge of wastes. This encompasses even cooking oils and discharged washing waters, and discharge of any oil of any kind from any source is generally prohibited by current regulations. On land, additional considerations of leaching into ground water systems and environmental impact upon urban and rural eco-systems also require evaluation and appropriate regulations must be satisfied. Severe operational cost penalties and potential punitive damages effectively preculde the use of oil base drilling fluids except where absolute necessity demands a costly solution to disposal problems, and frequently the decision is to abandon the well in those instances where the vastly superior performance of oil base fluids imposes severe cost factors and potential earnings are insufficient to overcome these cost factors. With the present invention, a clean, environmentally safe, and economically feasible method of disposal of oil well cuttings contaminated with oil from an oil base drilling fluid or mud is provided.

Referring now to FIG. 1, it is to be noted that a single continuous apparatus is depicted, each half being shown with some degree of overlap for convenience. Cuttings burner apparatus 10 is comprised of first stage 12, second stage 14, and gas collection and recycling leg 16. Combined drilling fluid and drill cuttings are pumped to a storage receptacle until ready for processing. The contaminated cuttings are mechanically separated from recyclable drilling fluid at a gravity screen or shale shaker and are then introduced into a surge hopper to allow for variation is feed rates. First stage 12 accordingly comprises inlet pipe 20 for receiving contaminated cuttings in the form of slurry from the surge hopper, the slurry entering plenum 22, where auger 24 forces the slurry in plenum 22 downwardly into and through the first stage 12. Auger 24 has blades mounted on shaft 26, which is powered by drive means (not shown) for rotation in a clockwise direction, viewed from above. Shaft 26 conicides with the axis of the apparatus 10 and enables all materials transfer operations to be conducted from a single source of drive means. First stage drum 30 rotates with shaft 32, concentric with shaft 26 and powered by the same means, and drum 30 is provided with two flights 34 of blades to urge material undergoing treatment in first stage 12 downwardly through tube 36. Drum 30 is rotatable, and tube 36 can also be rotated to vary the relative speed of rotation between drum 30 and tube 36. Accordingly, tube 36 is mounted on bearing 38, and can be driven by worm gear 40 at a desired speed of rotation in either the clockwise or counterclockwise direction. Tube 36 is preferably constructed of a corrosion-resistant high-temperature alloy, such as a chromium-nickel alloy sold under the trademark, "Inconel". Heating coils 42 or other heating devices surround or are associated with the heated portion of tube 36 to raise the temperature of the tube and cuttings forced through the gap 44 between drum 30 and tube 36 to a temperature of about 1400° F. (760° C.). Evolution of the major portion of the hydrocarbon materials occurs in first stage 12, such gases passing upwardly into receiving chamber 46 and thence downwardly through annular space 48 in the direction of the arrows. Shaft 32 is centered within housing 50 with the aid of air cooled bearings 52. Insulation material 54 aids in retaining heat otherwise lost by radiation, conduction, or convection. Result of heating in first stage 12 is to dry the incoming cuttings somewhat and to form a cake within gap 44 as volatilized gases begin to be evolved. The cake which is still a slurry is continuously removed under the influence of blades 34, falls into discharge region 600 where further evolution of gases can occur, all gases emerging from discharge region 60 into gas recycle pipe 62. Cuttings fall into the second stage 14 from reducing tube section 66 and pass into through-heat gap 68 of second stage 14. Gap 68 is formed between second stage drum 70 and second stage tube 72, which is also preferably constructed of a nickel-chromium alloy capable of withstanding the high temperatures, typically about 2600° F. (1425.2° C.), corrosion problems related to the abrasive nature of solid particles passing through gap 68 and corrosion resulting from gaseous problems evolved during heating of the solid particulate matter. The six flights of blading 74 attached to drum 70 generates sufficient pressure, which, along with the temperatures generated between tube 72 and drum 70, causes the residue on and in the cuttings material passing through gap 68 to volatilize completely and ignite. Product emerging from outlet 76 is powdered with all oxidizible residue removed falling downwardly through hollow tube 78 toward die block 80, the purpose of which is to provide the resistance required to yield internal pressures necessary to complete the combustion of the volatile mass. The auger flight 79 discharges residue through the die block 80. Additionally, die block 80 allows any unburned gases, entrained in the cuttings, to be vented through a collecting manifold 82 and recycled through gas collection and recycling leg 16. The now acceptable effluent exits the device through exit tube 84 where a water spray formed from water inlet 86 can serve to cool and consolidate the material for pelletizing or otherwise placing into a convenient form for handling or form a slurry which may be discharged at the ocean floor. The emergent material can be disposed of without concern for potential jeopardy due to violation of ecological or environmental regulations. Preferably, tube 72 is heated electrically by resistance heating between electrodes 88 and 90, although other means of heating can also be used, such as induction heating, provision of coils similar to those of coils 42, and the like. Drum 70 is heated internally through combustion of volatilized gases entering through recycle tube 94 of leg 16. Pressurized air or oxygen enters through line 96 and complete combustion occurs within drum 70, the exhaust gases exiting through perforations 98 on shaft 100. Maintenance of a desired pressure in drum 70 is possible with use of gas lock arrangement 102. Additional air or oxygen input through line 104 furnishes heating for lower arm 106, which is used for heating of die block 80, with combustion gases exiting through exhaust 108 to a flare burn off or the like. The arrangement of the lower portion of the apparatus is best seen in FIG. 5, where the swirling action obtainable is readily visible. Channels 110 in die block 80 direct the product through orifices 112 where pulverization occurs and where selection of the orifice size and number determines the pressure obtainable in second stage 14. Drum 70 is held on shaft 114 and rotates as shaft 114 rotates in a clockwise direction. Igniter 116 insures complete combustion of gases in the lower part of gas collection and recycling leg 16. In order to minimize heat losses, insulation can be placed in region 120 between tube 72 and housing 122. Preferably, tube 72 and drum 70 are made of a nickel-chronium alloy sold under the name "Inconel".

Due to the closed loop venting of combustible gases within the system, apparatus 10 poses little hazard at drilling sites and its straight line design and single drive shaft allow it to be rigged between decks or outboard of the platform of an offshore drilling rig, thereby minimizing the space requirements for installation. By providing a separate electrical generator, the electrical requirements can be easily handled without burdening generators furnishing power for other purposes. Moreover, the unit is self-contained and therefore easily portable. After the operating temperature has been reached the combustible products will substantially maintain operating temperatures in most instances whereby the electrical power requirements for heating are dramatically reduced, and through-heating can produce operational efficiencies as high as 90%. The preferred temperature of 2600° F. in the second stage 16 is easily obtainable.

In the second form of the invention, shown in FIG. 2, cuttings separated from recyclible oil base drilling fluid at a shaker are automatically introduced from a surge hopper into inlet pipe 130 of the device of FIG. 2 shown generally by the numeral 132. The raw cuttings from pipe 130 enter first stage 134 and are then transferred to second stage 136, with recycling of evolved gases in a closed recycling loop 138. Drive means 140 rotate shaft 142 which drives first stage 134 on shaft 144, and drives screw conveyor 146 on shaft 148, as well as driving dust slinger 150 through shaft 152. Drive means 140 is an electric drive motor operating at low speed and high torque, having a selectable low speed drive shaft 142 or a high speed drive shaft 142 and appropriate gearing within gear box 153. Raw cuttings from inlet pipe 130 pass into first stage 134 by slinger ring 158, which deposits the raw contaminated cuttings evenly on the interior surface 160 of cone 164. With use of induction type heater coils 162, cone 164 causes preheating of the cuttings to approximately 1400° F. (760° C.). As a result of the heating in this stage, the cuttings are dried somewhat and form a cake on the interior surface 160 of cone 164 and begin to give up volatilized gases which are gathered into pipe 170 by blower 172. The cake formed on the interior of cone is continuously removed by scraper means falling into pulverizer 174, which reduces the cuttings to a granular material of about 200 micron size. Heating within the interior of cone 164 is facilitated by heater 176, which operates by return line 178 from the final stage of the apparatus. The cuttings in granular form are forced by screw conveyor 146 into and through the second stage 136 under high pressure generated by screw conveyor 146. Screw conveyor 146 is housed in stainless steel pipe unit section 180 which is joined to pulverizer 174 by flange 182. Power screw 146 forces the cuttings into corrosion-resistant second stage pipe 182, which is preferably made of high-temperature corrosion-resistant chromium-nickel alloy, such as that sold under the name "Inconel". The cuttings in second stage 136 occupy a relatively narrow gape 154 between shaft 152 and tube 182, where they are raised to a temperature of preferably about 2600° F. (1425.2° C.).

The extreme pressure and temperature in second stage 136 causes the residue on and in the cuttings to volatilize completely and to ignite. Second stage 136 is further promoted by introduction of volatilized gases from the first stage which, when mixed with air injected from line 186 cause heating of hollow shaft 152. These gases serve not only to reduce the power requirements needed to maintain the through-heating temperature but also as an ignition additive for gases which are volatilized in second stage 136 and pass into line 178. Cuttings emerging from tube 182 are now powdered and have all oxidizable residue removed, and are then extruded through die block 188. Preferably, the orifice size through which the product passes is about 1/32", although this dimension can be varied. Resistance required to yield the internal pressures necessary for complete combustion of volatile products results from reistance provided by die block 188, and any unburned gases entrained in the cuttings can be vented through a collecting manifold in die block 188 and recycled through line 178 back to pulverizer 174 for pre-heating of incoming solid matter. The clean solid material exiting from die block 188 is cooled and consolidated by water from water spray 190 and may be pelletized or otherwise placed into a convenient form for handling. Dust slinger 150 can optionally be provided for disposal of the clean material into a body of water. Due to closed loop venting of combustible gases within the system, the device poses little hazard to drilling sites and its straightline design will allow it to be rigged between decks or outboard of a platform of offshore drilling rig, thereby minimizing the space requirements for installation. All major criteria indentified as necessary for successful development of a cuttings disposal device have been addressed with the invention forms described. It should be particularly noted that the device is effective with cuttings derived from commonly encountered rock types, including shale characterized by numerous fracture planes in which oil can become embedded. Accordingly, an extremely thorough removal of hydrocarbon materials, even those naturally occuring in the formation rock, can occur.

Further, a layering effect occurs in the course of passage through gap 154 in the apparatus of FIG. 2 or in gap 68 in the apparatus of FIG. 1. Some degree of fusion or liquifaction appears to occur in cuttings raised to the temperature in the gap, with the result that erosion of the nickel-chromium alloys defining the gap is minimized, and long periods of use without the necessity for replacement have been found when "Inconel" nickel-chromium alloy is used.

In a test of the apparatus essentially as described in connection with discussion of FIG. 2 above, three cutting samples were analyzed. Sample 1 represents cuttings before treatment, while samples 2 and 3 represent cuttings treated in the apparatus. Tests were performed to measure the oil content, the soluble metal content, and methylene blue capacity of the shale cuttings samples.

Table 2 shows the results of the tests. The tests for oil and grease were performed by extracting 25 grams of each sample with freon. This extract was then examined by infrared spectroscopy against a set of controls in the standard manner.

The water soluble constituents of samples 2 and 3 were measured by extracting 25 grams of each sample with 25 milliliters of dionized water, the extract being filtered and analyzed by atomic absorption spectroscopy. The cation exchange capacity of samples 2 and 3 was determined by the methylene blue test. The measured cation exchange capacity of less than 0.1 meq/100 gram of cuttings indicates that the cuttings have been converted to an inert ceramic material by the cuttings cleaner. This test was performed on a slurry of 50 grams ground cuttings per 100 milliliters of deionized water. The slurry was then titrated with methylene blue solution to the end point and the cation exchange capacity calculated. Ignition loss for samples 2 and 3 indicates that oxygen reacted to some of the compounds present in those samples. The moisture content test was performed by drying preweighed samples in porcelain crucibles at 105° C. for 2 hours. The moisture content was calculated, and the samples were then placed in a muffle furnace in an oxidizing atmosphere and heated up to 950° C., being held at that temperature for 2 hours. After cooling, the samples were reweighed and the ignition loss calculated. Results of these tests appear in Table 2.

It is seen that hydrocarbons have been reduced to below 0.2 parts per million. Further, when mixed with sea water, the cuttings reveal no discernible sheen on the water surface.

If is further to be noted that solid waste materials of miscellaneous types generated at an oil drilling rig site can be mixed with cuttings for disposal with the apparatus of the present invention. For example, sewage, pulverized garbage, and the like on a mobile offshore drilling rig can be handled, thereby affording the capability of handling environmental problems associated with treatment of solid waste generated in the course of operation of an offshore facility.

Further, low levels of hydrocarbon contamination can be handled with the present apparatus, such as occurs on beaches, and the like, where oil spills have accummulated on sand or other beach materials. Accordingly, the portability of the present apparatus enables its use on a beach site, either by transporting along the land or on a barge or other marine craft parallel to the beach for processing of contaminated beach material.

An advantage of the present construction of each form of the invention is that no closely spaced moving parts in the high-temperature second stage area exist, and accordingly, laminar flow of the slow-moving charge of solid materials can serve to reduce the resistance between the material and high-temperature "Inconel" components. As is well-known, erosion is a continuous problem in high-temperature apparatus and conventional solutions to the problem of erosion involve hard facing, or use of expensive tungsten carbide alloy materials. However, the chromium-nickel alloy of the present invention has been found greatly superior to such materials in actual use without the necessity for rebuilding, as is conventionally required. In a test wherein cooling of a sample in progress was carried out, the solid material in the gap appeared to have generated a liquified film 73 on the surfaces of the drum 70 and tube 72 as shown in FIG. 6 which also illustrates the laminar flow of the cuttings. Such a film could account for the high erosion resistance encountered under the conditions of operation of the present apparatus. Preferably, the gap is about 3/16" in thickness, with successful use of thicknesses up to ⅜". However, if the thickness is excessive, improper treatment will result.

It is an important feature of the present invention when constructed as shown, with a self-contained structure, a virtual explosion-proof device results. In addition, a pressure vessel can be constructed around the entire apparatus to provide additional assurance of containing any explosions which could result. With the rotating cone concept of the apparatus of FIG. 2 in the preheater, the cuttings are spread over a large area, thereby facilitating evolution of hydrocarbons and moisture in first stage 134.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

TABLE 1

| DESCRIPTION OF SAMPLES | |
|---|---|
| Sample No: | Description |
| 1 | Oily Cuttings Sample |
| 2 | Light Colored Dry Cuttings |
| 3 | Dark Colored Dry Cuttings. |

TABLE 2

| TEST RESULTS OF SAMPLES | | | |
|---|---|---|---|
| | Sample No. | | |
| Test | 1 | 2 | 3 |
| Oil and Grease, ppm | 78,100 | less than 0.2 | less than 0.2 |
| Water Soluble Constituents | | | |
| Barium, ppm | — | 1.3 | 105 |
| Chromium, ppm | — | 0 | 0 |
| Zinc, ppm | — | 0 | 0 |
| Cation Exchange Capacity meq/100 grams Clay by Methylene Blue Test | | less than 0.1 | less than 0.1 |
| Ignition loss | wt. loss | wt. gain | wt. gain |
| grams/gram of sample | 0.0257s | 0.00945 | 0.0144 |
| Ignition Loss | wt. loss | wt. gain | wt. gain |
| Weight % | 2.57% | 0.945% | 1.44% |
| Moisture Content | | | |
| Weight % | 9.19% | 0.24% | 0.125% |

What is claimed as new is as follows:

1. A device for removing combustible material from cuttings resulting from well drilling operations, said cuttings consisting of a slurry of underground strata chips, an oil base phase containing hydrocarbons and an aqueous phase, the device comprising a preheating stage wherein said cuttings are preheatable and the major fraction of said hydrocarbons and aqueous phase are removable, a second stage in axial alignment with and receiving material from the preheating stage, said second stage including a vertically disposed open cylindrical outer tube having inlet means at the upper end thereof and outlet means, an inner support shaft concentric with the outer tube, a screw auger on the shaft for conveying said slurry through the annular space between the outer tube and the support shaft wherein the outer tube is adapted for heating said slurry in the annular space so that said hydrocarbons are volatilized and removed from the tube and a residual solid material substantially free of hydrocarbons is removable from the outlet means of the tube, a collecting tube attached to said preheating stage, a blower interposed between the collecting tube and the preheating stage for gathering said volatilized hydrocarbons therefrom, whereby the volatilized hydrocarbons are conducted away from the preheating stage and gas injection means for introducing an oxygen containing gas to said volatilized hydrocarbons in the collecting tube, said injection means being connected to said cylindrical tube for ignition and combustion of the volatilized hydrocarbons, and introduction into said cylindrical tube.

2. The device of claim 1 wherein a pulverizer is connected between said preheating stage and said outer tube, said pulverizer being connected to said outer tube by a power screw.

3. The device of claim 2 wherein said preheater stage comprises a hollow cone having an inner surface on which said cuttings are slung, said cone being provided with heating means for raising the temperature of said cuttings on the interior surface thereof with evolution of said volatilized hydrocarbons and moisture, said cone being provided with scraping means for removal of said material resulting therefrom, said solid material passing into said pulverizer.

4. The device of claim 3 wherein said cone is heated by induction heating to a temperature of about 1200° F. (649° C.).

5. A device for removing combustible material from cuttings resulting from well drilling operations, said cuttings consisting of a slurry of underground strata chips, an oil base phase containing hydrocarbons and an aqueous phase, the device comprising an open cylindrical outer tube having inlet means and outlet means, an interior support drum concentric with the outer tube, and propelling means for introducing said slurry through the inlet means into the annular space between the outer tube and the support drum, wherein the outer tube is adapted for heating said slurry in the annular space so that said hydrocarbons are volatilized and removed from the tube and a residual solid material substantially free of hydrocarbons is removable from the outlet means of the tube, a preheating stage wherein said cuttings are preheatable and the major fraction of said hydrocarbons and aqueous phase are removable, said preheating stage being connected to said cylindrical outer tube with the preheater stage and outer tube adapted for continuous operation, said device being characterized by an axis common to said preheater stage and said cylindrical outer tube, said propelling means being located on a shaft coincident with said axis, said shaft being operable by drive means connected to the device, said volatilized hydrocarbons being collectible in a collecting tube between the preheater stage and the drum in the outer tube, and gas injection means for introducing an oxygen containing gas to said volatilized hydrocarbons in the collecting tube, said preheating stage comprising a cylindrical drum provided with helical blades receivable within a rotatable cylindrical tube, whereby the relative rotation of said drum and said rotaable tube is adjustable, said drum being centered on said shaft by bearings.

6. The apparatus of claim 5 wherein said outer cylindrical tube receives a cylindrical drum provided with a plurality of flights of helical blades, said cylindrical drum being mounted on said shaft, said cylndrical tube being provided with a pair of spaced electrodes for heating by electrical resistance.

7. The apparatus of claim 6 wherein said outer heating raises said cylindrical tube to a temperature of about 2600° F. (1425.2° C.).

8. The device of claim 7 wherein said preheating stage raises the temperature of said rotatable cylindrical tube to about 1400° F. (760° C.).

9. The device of claim 8 wherein the drum of said preheater stage and the drum in said outer cylindrical tube are connected by a common shaft falling on said axis.

10. The device of claim 9 wherein a die block receives the residual solid material dischargeable through said outlet means, said die block having a plurality of orifices for pulverizing said residual solid material and for enabling a build-up of pressure in said cylindrical tube.

11. The method of removing combustible and volatile materials from a slurry containing such materials consisting of the steps of moving the slurry as a thin film between a first pair of surfaces at least one of which is heated to remove a substantial portion of the combustible and volatile material from the slurry as a gaseous product, subsequently moving the slurry as a thin film between a second pair of surfaces at least one of which is heated to remove the remainder of the combustible and volatile materials from the slurry and discharging residue substantially free of combustible and volatile materials, moving the surfaces in each pair of surfaces relative to each other as the thin film of slurry moves therebetween, each of said steps of moving the thin film including the step of conveying the thin film between a pair of concentric spaced cylindrical surfaces having an annular gap therebetween with at least one of the surfaces being rotated and provided with a spiral auger blade in the gap to move the thin film and agitate the solid constituents of the slurry, said step of rotating at least one of the cylindrical surfaces including the step of rotating both of the cylindrical surfaces which form the first pair of moving surfaces with the relative rotational speed being variable.

12. The method as defined in claim 11 together with the step of heating both of the first pair of surfaces to about 1400° F. and the second pair of surfaces to about 2600° F.

13. The method as defined in claim 11 together with the step of burning the gaseous product produced when moving the film through both pairs of surfaces with the heat produced being used to heat the surfaces thereby reducing energy input from outside sources.

14. The method as defined in claim 11 wherein the slurry is the cuttings from an oil well drilling operation using oil base drilling fluid, said thin film being formed into a laminar flow film with a film of liquified slurry against each of the heated surfaces.

* * * * *